United States Patent
Elliott et al.

(10) Patent No.: US 9,418,398 B2
(45) Date of Patent: Aug. 16, 2016

(54) LOW POWER SUBPIXEL RENDERING ON RGBW DISPLAY

(71) Applicant: Samsung Electronics Co., Ltd., Suwon-si, Gyeonggi-do (KR)

(72) Inventors: Candice Hellen Brown Elliott, Santa Rosa, CA (US); Anthony Botzas, San Jose, CA (US); Michel Francis Higgins, Duncans Mills, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 245 days.

(21) Appl. No.: 14/304,214

(22) Filed: Jun. 13, 2014

(65) Prior Publication Data
US 2015/0363944 A1  Dec. 17, 2015

Related U.S. Application Data

(60) Provisional application No. 62/011,311, filed on Jun. 12, 2014.

(51) Int. Cl.
| | |
|---|---|
| G06T 3/40 | (2006.01) |
| G06T 5/00 | (2006.01) |
| H04N 9/04 | (2006.01) |
| H04N 9/07 | (2006.01) |
| H04N 5/355 | (2011.01) |
| G06T 5/50 | (2006.01) |
| G06T 7/00 | (2006.01) |
| G06T 7/40 | (2006.01) |
| G06K 9/46 | (2006.01) |
| G09G 5/02 | (2006.01) |
| G09G 5/10 | (2006.01) |

(52) U.S. Cl.
CPC ............ *G06T 3/4015* (2013.01); *G06K 9/4652* (2013.01); *G06T 5/001* (2013.01); *G06T 5/002* (2013.01); *G06T 5/003* (2013.01); *G06T 5/50* (2013.01); *G06T 7/0024* (2013.01); *G06T 7/0081* (2013.01); *G06T 7/408* (2013.01); *G09G 5/02* (2013.01); *G09G 5/10* (2013.01); *H04N 5/35563* (2013.01); *H04N 9/045* (2013.01); *H04N 9/07* (2013.01); *G06T 2207/10016* (2013.01); *G06T 2207/10024* (2013.01); *G06T 2207/20182* (2013.01); *G06T 2207/20192* (2013.01); *G06T 2207/20201* (2013.01); *G06T 2207/20208* (2013.01); *G06T 2207/20221* (2013.01)

(58) Field of Classification Search
None
See application file for complete search history.

(56) References Cited

U.S. PATENT DOCUMENTS

2009/0066731 A1 * 3/2009 Kim .................... G09G 3/3607
345/690

* cited by examiner

*Primary Examiner* — Mark Zimmerman
*Assistant Examiner* — Vu Nguyen
(74) *Attorney, Agent, or Firm* — Jefferson IP Law, LLP

(57) ABSTRACT

An apparatus and method for providing low power subpixel rendering are provided. The method includes receiving image data for a first pixel of a captured image, receiving image data for a second pixel of the capture image, determining a first saturation value of the first pixel and a second saturation value of the second pixel, determining a maximum saturation value based on the first saturation value and the second saturation value, and rendering a subpixel value using a one dimensional filter or a unity filter based on the determined maximum saturation value.

28 Claims, 5 Drawing Sheets

LOW POWER SUBPIXEL RENDERING ON RGBW DISPLAY

CROSS REFERENCE TO RELATED APPLICATION(S)

This application claims the benefit under 35 USC §119(e) of U.S. Provisional Application No. 62/011,311, filed Jun. 12, 2014, the entire disclosure of which is hereby incorporated by reference.

TECHNICAL FIELD

The present disclosure relates to an apparatus and method for rendering subpixels. More particularly, the present disclosure relates to an apparatus and method for rendering subpixels using less power while maintaining an acceptable image.

BACKGROUND

Mobile terminals were first developed to provide wireless communication between users. As technology has advanced, mobile terminals now provide many additional features beyond the simple telephone conversation. For example, mobile terminals are now able to provide advanced functions such as an alarm, a Short Messaging Service (SMS), a Multimedia Messaging Service (MMS), E-mail, games, short range communication, an image capturing function using a mounted digital camera, a multimedia function for providing audio and video content, a scheduling function, and many more. With the plurality of features now provided, a mobile terminal has effectively become a necessity of daily life for most people.

As part of the image capturing function, a processor of the mobile terminal receives image data from the mounted digital camera and ultimately controls to output a corresponding image on a display unit. In order to provide the image on the display unit, the data received from the digital camera must first undergo a series of manipulations.

FIG. 1 illustrates a captured image and a display unit for displaying an image corresponding to the captured image according to the prior art.

Referring to FIG. 1, an image 104 is captured by a digital camera of the mobile terminal. Raw data corresponding to the captured image 104 is manipulated such that it may be displayed (i.e., substantially reproduced) on a display unit 110. Image 104 is represented by a plurality of pixels 106, wherein each pixel 106 is associated with a color that should be substantially reproduced by the display 110. To display the image 104 on the display unit 110, each pixel 106 is mapped onto a set of one or more subpixels of the display unit 110, which then display the pixel's color.

In the prior art, each subpixel of the display unit 110 displays a "primary" color. That is, each subpixel is associated with a specific hue value and a specific saturation value. In some display units, each repeating set of subpixels includes a subpixel for each primary color. The subpixels are small and spaced closely together to provide a desired resolution. However, this structure is not cost-effective because it does not match the resolution of human vision. Humans are more perceptive to luminance differences than to chromatic differences. Therefore, some display units map an input pixel 106 onto a subpixel repeating set that does not include the subpixels of each primary color. In such a display unit, while the chromatic resolution is reduced, the luminance resolution remains high and the reproduced image is quite acceptable to the viewer. The display unit 110 is an example of such an implementation.

The display unit 110 is a Red, Green, Blue, and White (RGBW) type, with red subpixels 120R, blue subpixels 120B, green subpixels 120G, and white subpixels 120W, wherein each subpixel is equal in area. Each set of RGBW subpixels is divided into two sets 124 of adjacent subpixels in the same row. These sets 124 are called "pairs". Each pair 124 consists of either a red subpixel 120R or a green subpixel 120G (i.e., an RG pair) or a blue subpixel 120B and a white subpixel 120W (i.e., a BW pair). In each RG pair, the red subpixel is to the left of the green one, and in each BW pair, the blue subpixel is on the left. The RG and BW pairs alternate in each row and each column.

The pixel 106 in column x and row y of the image (i.e., pixel $106_{x,y}$) is mapped onto the subpixel pair 124 in column x and row y (i.e., subpixel pair $124_{x,y}$). Notably, in the display unit 110, the consecutive indices x and y denote consecutive pairs, not consecutive subpixels. Each subpixel pair 124 has only two subpixels, and provides a high range and resolution in luminance but not in chrominance. Therefore, part of the input pixel's luminance may have to be shifted to adjacent pairs 124 in a SubPixel Rendering (SPR) operation.

FIG. 2 illustrates a method of SPR according to the prior art.

Referring to FIG. 2, an SPR operation is illustrated for red subpixels 120R and green subpixels 120G only. The SPR operation for blue subpixels 120B and white subpixels 120W is performed in a similar manner but is not described here for sake of brevity. The SPR operation calculates the values Rw, Gw, Bw, Ww defining the luminances for the respective red subpixels 120R, green subpixels 120G, blue subpixels 120G and white subpixels 120W in a linear manner (i.e. the luminances are linear functions of the subpixel values). However, different functions may be used for different primary colors. The Rw, Gw, Bw, Ww values are then used to determine electrical signals provided to the subpixels to obtain the desired luminances.

In FIG. 2, the pixels 106 of image 104 are shown superimposed on the respective subpixel pairs 124. Again, for sake of brevity and ease of explanation, only the RG pairs 124 of the display unit 110 are illustrated. The display area is subdivided into sampling areas 250 centered at the respective RG pairs 124. The sampling areas 250 can be defined in different ways, and in FIG. 2 diamond-shaped areas 250 are chosen. The areas 250 are congruent to each other except at the edges of the display.

The color of each pixel 106 is expressed in a linear RGBW color coordinate system. For each RG pair $124_{x,y}$, the Rw value of the red subpixel is determined as a weighted sum of the R coordinates of all the pixels 106 which overlap with the sampling area 250 centered at the RG pair $124_{x,y}$. The weights are chosen to add up to 1, and are proportional to the areas of overlap of the respective pixels 106 with the sampling area 250. In particular, if the subpixel pair $124_{x,y}$ is not at the edge of the display, then the red value Rw is expressed by Equation (1).

$$R_w = 1/2 * R_{x,y} + 1/8 * R_{x-1,y} + 1/8 * R_{x+1,y} + 1/8 * R_{x,y-1} + 1/8 * R_{x,y+1} \quad \text{Equation (1)}$$

In other words, the red subpixels 120R can be rendered by applying a 3×3 diamond filter to the R coordinates of the respective pixels 106 with the filter kernel of Equation (2).

$$\begin{vmatrix} 0 & 1/8 & 0 \\ 1/8 & 1/2 & 1/8 \\ 0 & 1/8 & 0 \end{vmatrix} \qquad \text{Equation (2)}$$

The same filter kernel can be used for the green, blue and white subpixels (except at the edges). Further processing may be employed, such as the use of sharpening filters to address any luminance shifts as well as gamut mapping.

While the above described SPR method provides an excellent resultant image for display, the use of the 3×3 diamond filter of Equation (2) requires the use of a plurality of row buffers in order to store information necessary for rendering each subpixel. Because each row buffer requires power for its operation, it is desirable to perform SPR using a method that reduces or eliminates the need for row buffers.

Accordingly, there is a need for an improved apparatus and method for performing SPR that provides sufficient image quality while reducing the required number of row buffers and producing a desired image.

SUMMARY

Aspects of the present disclosure are to address at least the above-mentioned problems and/or disadvantages and to provide at least the advantages described below. Accordingly, an aspect of the present disclosure is to provide an apparatus and method for reducing the amount of power necessary for performing SubPixel Rending (SPR).

Another aspect of the present disclosure is to provide an apparatus and method for reducing the number of logic circuits required to perform SPR.

Still another aspect of the present disclosure is to provide an apparatus and method for reducing the number of row buffers required to perform SPR.

In accordance with an aspect of the present disclosure, a method for rendering a subpixel is provided. The method includes receiving image data for a first pixel of a captured image, receiving image data for a second pixel of the capture image, determining a first saturation value of the first pixel and a second saturation value of the second pixel, determining a maximum saturation value based on the first saturation value and the second saturation value, and rendering a subpixel value using a one dimensional filter or a unity filter based on the determined maximum saturation value.

In accordance with another aspect of the present disclosure, an apparatus for apparatus for rendering a subpixel is provided. The apparatus includes a display unit configured to display an image, and an image processing unit configured to receive image data for a first pixel of a captured image, to receive image data for a second pixel of the capture image, to determine a first saturation value of the first pixel and a second saturation value of the second pixel, to determine a maximum saturation value based on the first saturation value and the second saturation value, and to render a subpixel value using a one dimensional filter or a unity filter based on the determined maximum saturation value is provided.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of various embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
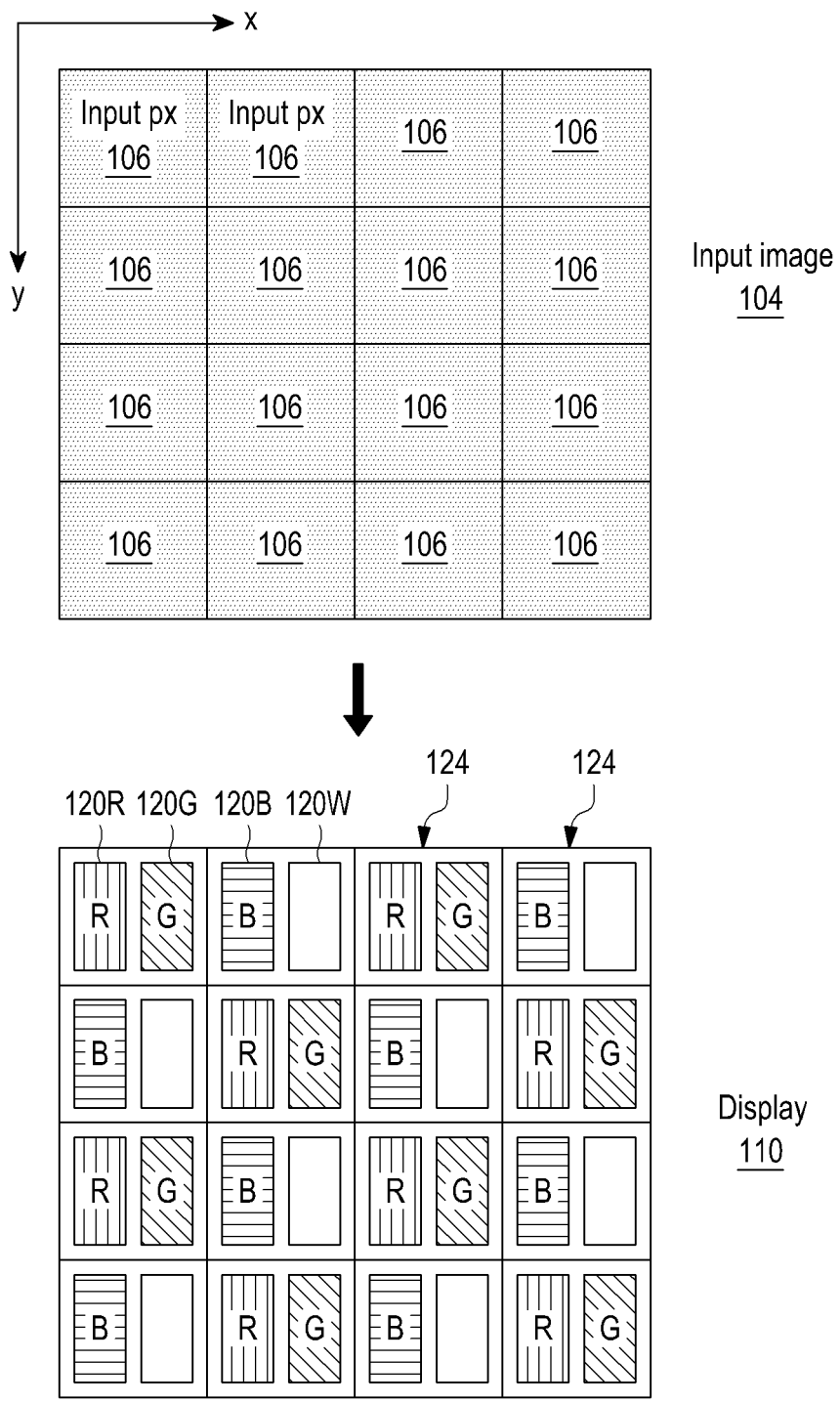
FIG. 1 illustrates a captured image and a display unit for displaying an image corresponding to the captured image according to the prior art.

Detailed descriptions of various aspects of the present disclosure will be discussed below with reference to the attached drawings. The descriptions are set forth as examples only, and shall not limit the scope of the present disclosure.

The detailed description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the disclosure. In addition, descriptions of well-known functions and constructions are omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the present disclosure are provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Unless defined differently, all terms used in the present disclosure, including technical or scientific terms, have meanings that are understood generally by a person having ordinary skill in the art. Ordinary terms that may be defined in a dictionary should be understood to have the meaning consistent with their context, and unless clearly defined in the present disclosure, should not be interpreted to be excessively idealistic or formalistic.

According to various embodiments of the present disclosure, an electronic device may include communication functionality. For example, an electronic device may be a smart phone, a tablet Personal Computer (PC), a mobile phone, a video phone, an e-book reader, a desktop PC, a laptop PC, a netbook PC, a Personal Digital Assistant (PDA), a Portable Multimedia Player (PMP), an MP3 player, a mobile medical device, a camera, a wearable device (e.g., a Head-Mounted Device (HMD), electronic clothes, electronic braces, an electronic necklace, an electronic appcessory, an electronic tattoo, or a smart watch), and/or the like.

According to various embodiments of the present disclosure, an electronic device may be a smart home appliance with communication functionality. A smart home appliance may be, for example, a television, a Digital Video Disk (DVD) player, an audio, a refrigerator, an air conditioner, a vacuum cleaner, an oven, a microwave oven, a washer, a dryer, an air purifier, a set-top box, a TV box (e.g., Samsung HomeSync™, Apple TV™, or Google TV™), a gaming console, an electronic dictionary, an electronic key, a camcorder, an electronic picture frame, and/or the like.

According to various embodiments of the present disclosure, an electronic device may be a medical device (e.g., Magnetic Resonance Angiography (MRA) device, a Magnetic Resonance Imaging (MRI) device, Computed Tomography (CT) device, an imaging device, or an ultrasonic device), a navigation device, a Global Positioning System (GPS) receiver, an Event Data Recorder (EDR), a Flight Data Recorder (FDR), an automotive infotainment device, a naval electronic device (e.g., naval navigation device, gyroscope, or compass), an avionic electronic device, a security device, an industrial or consumer robot, and/or the like.

According to various embodiments of the present disclosure, an electronic device may be furniture, part of a building/structure, an electronic board, electronic signature receiving device, a projector, various measuring devices (e.g., water, electricity, gas or electro-magnetic wave measuring devices), and/or the like that include communication functionality.

According to various embodiments of the present disclosure, an electronic device may be any combination of the foregoing devices. In addition, it will be apparent to one having ordinary skill in the art that an electronic device according to various embodiments of the present disclosure is not limited to the foregoing devices.

Figure 2:
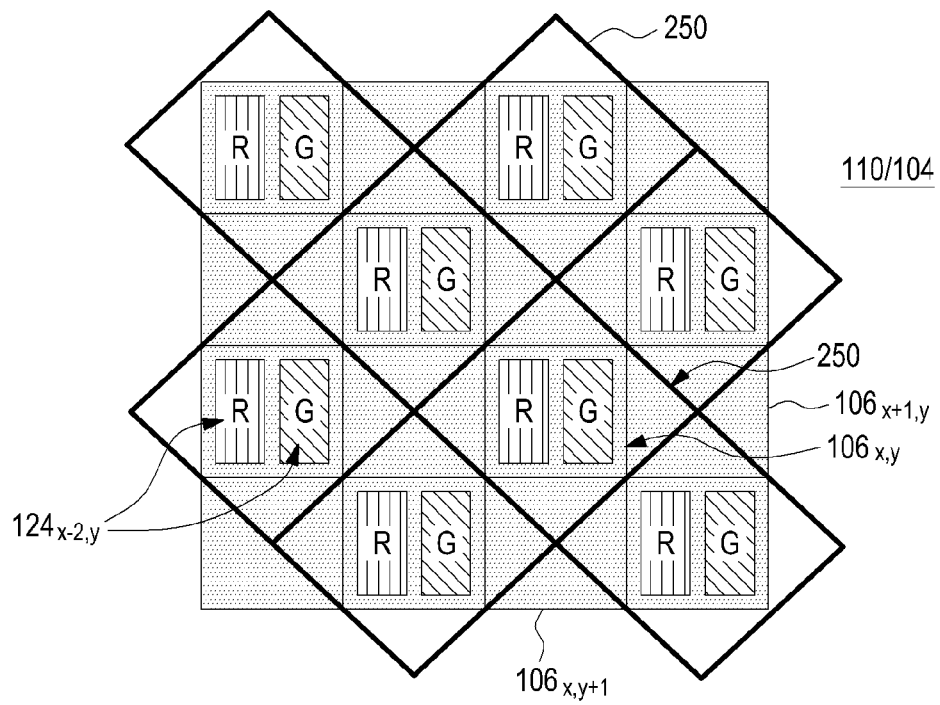
FIG. 2 illustrates a method of SubPixel Rendering according to the prior art.

In the related art, a method of performing SubPixel Rendering (SPR) in which the need for row buffers may be reduced is to limit the filter kernels to one dimensional (1D) arrays. Examples of a 1D array include a three tap tent filter, a two tap box filter, and the like. In such an SPR method, a saturation level of a pixel in a received image may be determined and, if the saturation level is above a threshold, the 1D filter is used to render the subpixels for display. However, if the saturation level is below the threshold, as it is in most areas of a typical image, the method uses a two dimensional (2D) filter kernel, such as the diamond kernel of FIG. 2, thus requiring row buffers for data storage.

Various embodiments of the present disclosure include an apparatus and method for SPR that eliminates the need for row buffers while producing an acceptable image for display. As part of the present invention, it has been discovered that SPR may be performed using a unity filter for images that are largely desaturated. That is, it has been found that image sharpness and correct color are maintained using a unity filter for mapping, even for very high spatial frequency images. However, the unity filter mapping is inadequate for highly saturated images having a high spatial frequency, especially on the diagonal axis. In that case, it has been found that a 1D filter kernel, such as a box filter, works quite well. Thus, in a first embodiment of the present disclosure, a unity filter and box filter are provided along with a method of determining the saturation of the colors of the image.

In a second embodiment of the present disclosure, a metamer exchange filter is further provided for image sharpening. As is known in the related art, a 2D diamond filter kernel may be used to perform anti-chromatic aliasing and a metamer exchange filter operating on a calculated luminance plane may be used to sharpen the image back. This system has the advantage that if luminance information occurs on only one of the original RGB color channels, the metamer sharpening reconstructs the original luminance signal, using all of the subpixel colors, without changing the color of the image. In the present disclosure, metamer sharpening is applied in a 1D filter set, such as a tent filter, a box filter, and the like. For example, a box filter would provide the anti-chromatic aliasing function and a two tap "box" like metamer exchange filter sharpens the image.

As will be explained in more detail below, the box filter and the sharpening filter may be done in white/color "pixel" pairs or always "leaning" in one direction. As above, the box filter without sharpening works best for saturated colors. Thus, a threshold decision or function may be used to switch between the pure box and the box plus meta-sharpening filter.

First Embodiment

As discussed briefly above, it has been discovered that a unity filter may be used for mapping an image to subpixels of a Red, Green, Blue, White (RGBW) type display unit when the image is largely desaturated. That is, the unity filter produces acceptable results including maintaining image sharpness and correct color, even for high spatial frequencies. However, unity filter mapping does not produce an acceptable result for images that are highly saturated and have high spatial frequencies, especially in the diagonal axis. In that case, a 1D filter, such as a box filter, a tent filter, and the like, produces acceptable results. Hence, the first embodiment provides an apparatus and method for SPR that employs a unity filter and a 1D filter based on a determined saturation of the image colors Importantly, by using only the unity and 1D filters, the need for row buffers is eliminated, as is the need to provide power to the corresponding row buffers.

Figure 3:
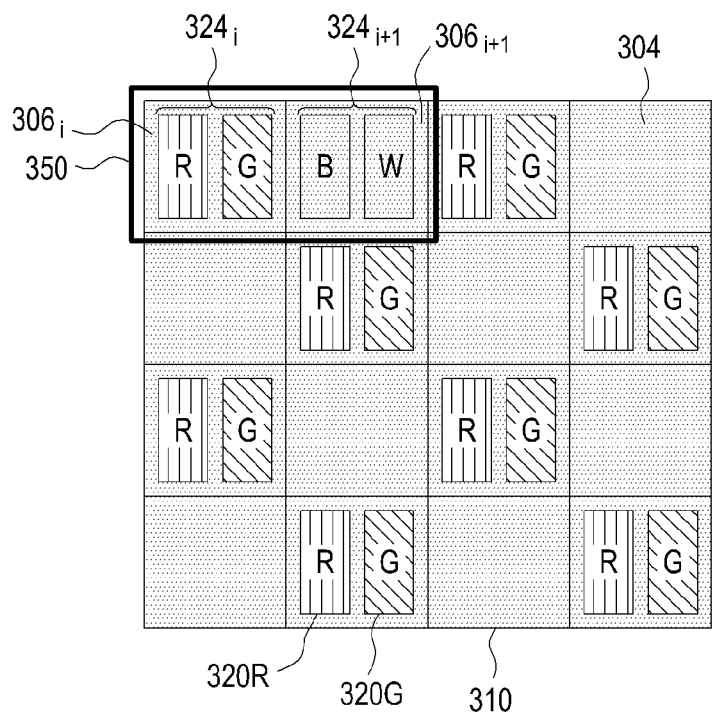
FIG. 3 illustrates a display unit according to various embodiments of the present disclosure.

FIG. 3 conceptually illustrates SPR on even pixels of an image according to various embodiments of the present disclosure.

Referring to FIG. 3, a display unit 310, similar to the display unit 110 of the prior art, is a Red, Green, Blue, White (RGBW) type, with red subpixels 320R, green subpixels 320G, blue subpixels (not shown), and white subpixels (not shown), wherein each subpixel is equal in area. The RGBW layout of the display unit 310 may be conceptualized as a checkerboard of white, achromatic pixels, comprised of a single clear subpixel, and full color pixels comprised of three subpixels (i.e., red, green, and blue). Hence, if there were no hardware and/or power limitations when performing subpixel rendering, the subpixels of the display unit 310 would be grouped so as to generate an RGB output and a W output. However, for a more efficient use of hardware and reduced power consumption, each set of RGBW subpixels is divided into two sets (i.e., $324_i$ and $324_{i+1}$) of adjacent subpixels in the same row. As explained with reference to FIG. 1, each set 324 is called a pair, wherein each pair 324 consists of either a red subpixel 320R and a green subpixel 320G (i.e., an RG pair) or a blue subpixel and a white subpixel (i.e., a BW pair). The RG and BW pairs alternate in each row and each column. In the following description, the RG pairs are considered even pairs and the BW pairs are considered odd pairs.

Also illustrated in FIG. 3 is an image 304 overlying the display unit 310. Here, the image 304 includes a first pixel 306$_i$ and a second pixel 306$_{i+1}$ that respectively overly the even RG pair 324$_i$ and the space for the odd BW pair 324$_{i+1}$. Hence, the first pixel 306$_i$ is designated an even pixel and the second pixel 306$_{i+1}$ is designated an odd pixel.

In processing the even pixel 306$_i$ to determine the values of the red subpixels 320R, green subpixels 320G of the even RG pair 324$_i$, saturation values for the even pixel 306$_i$ being processed and for the neighboring odd pixel 306$_{i+1}$ are determined. In implementation, the saturation values may be obtained in a variety of ways. For example, the saturation values may be have been previously determined and stored as part of another process. As another example, the saturation values may be calculated for the SPR. As an example, the saturation values may be calculated using Equation (3).

$$sat = 100\% - \frac{\min(r, g, b)}{\max(r, g, b)} \quad \text{Equation (3)}$$

After determining the saturation values for the even pixel 306$_i$ and the odd pixel 306$_{i+1}$, the saturation values are compared to determine which value is larger. The resultant maximum saturation value may be used to determine whether a unity filter or a 1D filter should be used for subpixel rendering. That is, a unity filter is generally preferred for an image having low saturation while a 1D filter is generally preferred for an image having high saturation. Accordingly, a threshold value may be established such that, if the saturation is above the threshold, a 1D filter is used and if the saturation is below the threshold, a unity filter is used. In that case, if the determined level of saturation was below the threshold such that the unity filter would be used, and if the even pixel 306$_i$ had a red level of R$_i$ and a green level of G$_i$, the respective values rendered for the red subpixel 320R$_i$ and the green subpixel 320G$_i$ as a result of the unity filter would simply be R$_i$ and G$_i$.

On the other hand, if the saturation is above the threshold, a 1D filter, such as a box filter (i.e., a box sampling area 350), would be used. In that case, if the even pixel 306$_i$ had a red level of R$_i$ and a green level of G$_i$, while the neighboring odd pixel 306$_{i+1}$ had a red level of R$_{i+1}$ and a green level of the respective values rendered for the red subpixel 320R$_i$ and the green subpixel 320G$_i$ as a result of box filtering would be (R$_i$+R$_{i+1}$)/2 and G$_{i+1}$+G$_{i+1}$)/2. That is, the box filter would render a subpixel value based on the average of the even pixel 306$_i$ and its neighboring odd pixel 306$_{i+1}$. In other words, as with the diamond filter described in Equation (1), the weights of the filter are chosen to add up to 1 and are proportional to the areas of overlap of the respective pixels 306$_i$ and 306$_{i+1}$ within the box sampling area 350.

It has further been discovered that alpha blending the results of the unity filter and the 1D box filter produces a further improved image. Here, the term alpha blending refers to a process in which the results of pixel rendering using a unity filter and the results of pixel rendering using a 1D filter are blended at a ratio that is dependent on the level of saturation. In other words, the determined saturation is used as the value of alpha. This can be expressed using Equation (4).

$$320R_i = (1-\text{sat})R_i + \text{sat}(R_i + R_{i+1})/2 \quad \text{Equation (4)}$$

In Equation (4), 320R$_i$ denotes the value rendered for red subpixel 320R$_i$, sat denotes the maximum saturation between the even pixel 306$_i$ and the neighboring odd pixel 306$_{i+1}$, R$_i$ denotes the red value of even pixel 306$_i$ and R$_{i+1}$ denotes the red value of neighboring odd pixel 306$_{i+1}$. As can be seen, the first term denotes the results of the unity filter multiplied by 1−sat while the second term denotes the results of the box filter multiplied by sat. As such, the value of Subpixel 320R$_i$ will not be based solely on the results of the unity filter or the results of the box filter but is instead based on an alpha (i.e., sat) blend of the results of both filters.

Figure 4:
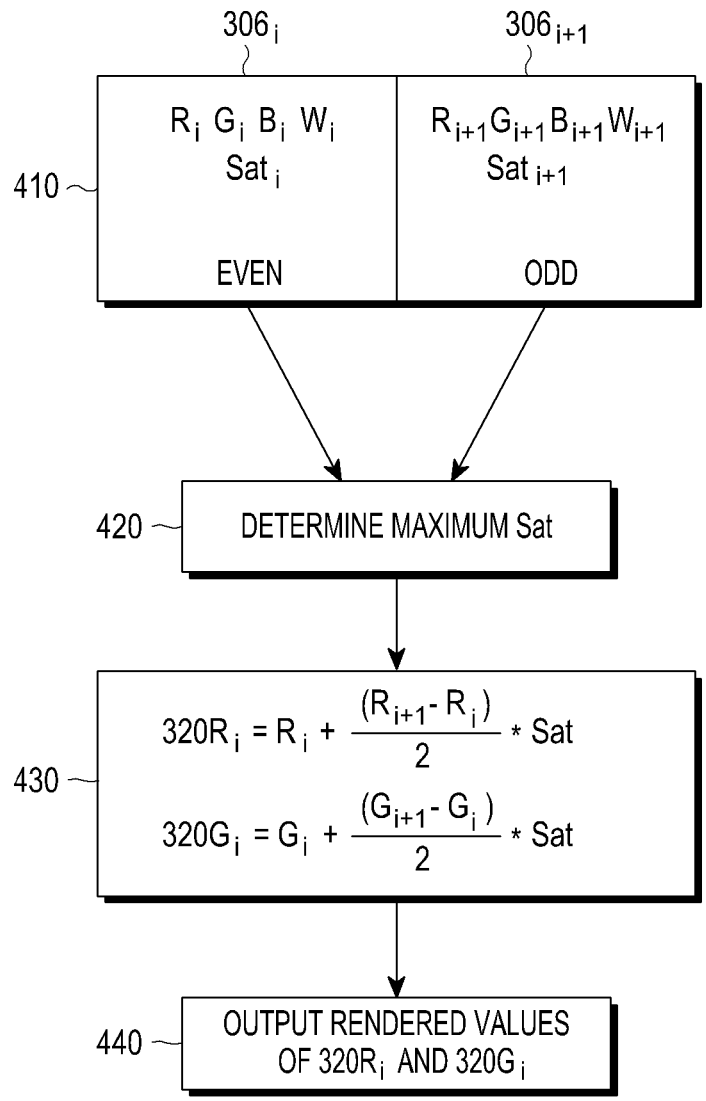
FIG. 4 is a pictorial representation of even pixel processing according to an embodiment of the present disclosure.

FIG. 4 is a pictorial representation of even pixel processing according to an embodiment of the present disclosure.

Referring to FIG. 4, a first, even pixel 306$_i$ of an image 304 and a neighboring odd pixel 306$_{i+1}$ of the image 304 are considered. As noted each of pixels 306$_i$ and 306$_{i+1}$ have R, G, B, W and saturation values associated therewith as indicated by the subscripts i and i+1. In operation 410, those values are obtained. In operation 420, the saturation values of the even pixel 306$_i$ and the odd pixel 306$_{i+1}$ are compared and the maximum value is selected and stored. Using the stored value of maximum saturation, values for the red subpixel 320R$_i$ and the green subpixel 320G$_i$ are determined in operation 430. As explained above with reference to Equation (4), the stored maximum saturation value is used to effect an alpha blend between a unity filter and a 1D box filter. Notably, while the calculation illustrated in operation 430 looks different from that described in Equation (4), they are mathematically identical. However, the calculation illustrated in operation 430 reduces the number of multipliers as compared to that in Equation (4), and thus reduces the processing burden. In operation 430, the values for red subpixel 320Ri and green subpixel 320Gi are determined using Equation (5).

$$320R_i = R_i + \left(\frac{R_{i+1} - R_i}{2}\right) * sat \quad \text{Equation (5)}$$
$$320G_i = G_i + \left(\frac{G_{i+1} - G_i}{2}\right) * sat$$

Upon examination of Equation (5), it can be seen that, if the value of saturation is low, the second term (i.e., the box filter term) will be of less consequence to the outcome such that the rendered subpixel value is skewed towards a unity filter result. On the other hand, if the value of saturation is high, the second term will be of greater consequence, thus the outcome will skew towards the 1D filter result. In operation 440, the rendered subpixel values (i.e., 320R$_i$ and 320G$_i$) obtained from processing the even pixel 306$_i$ are output.

Figure 5:
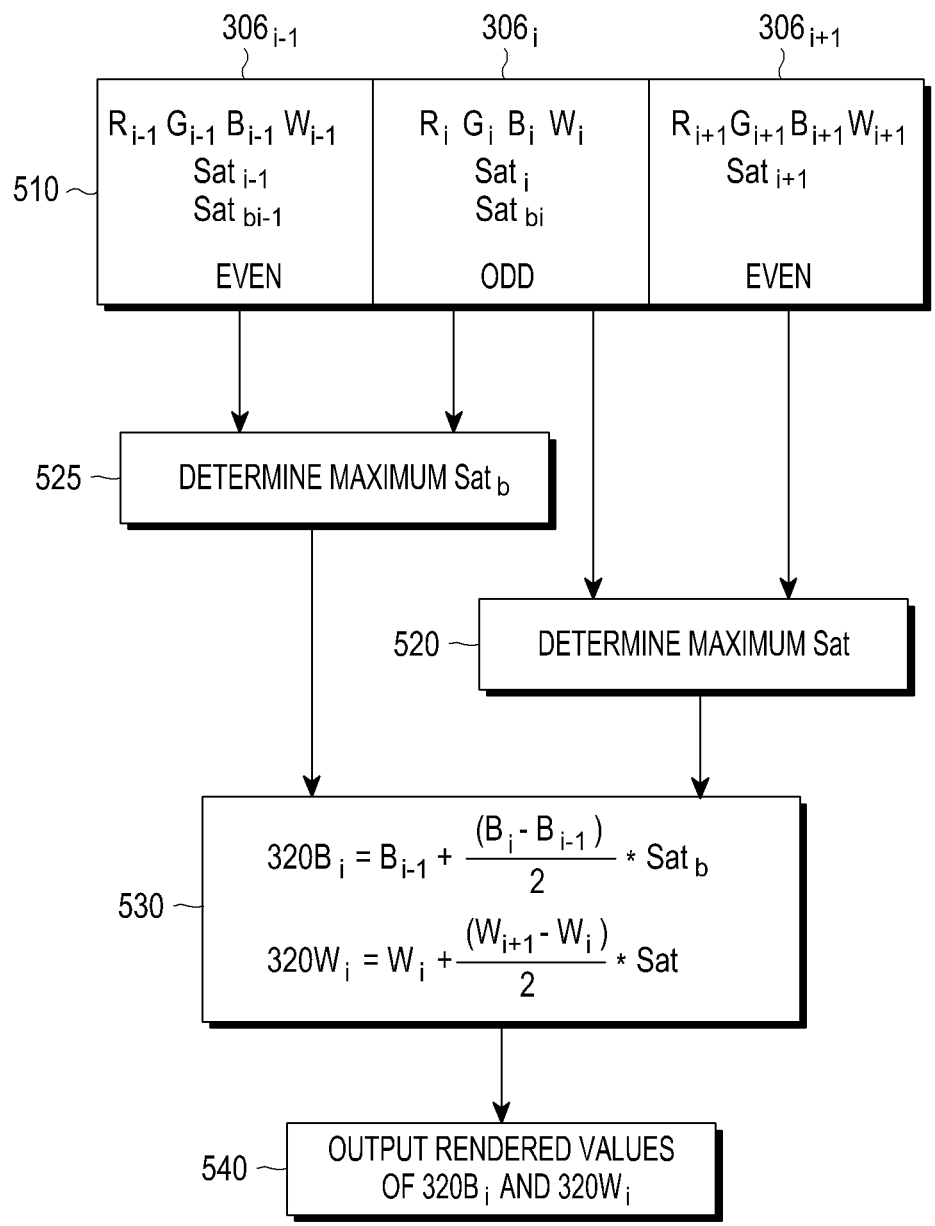
FIG. 5 is a pictorial representation of odd pixel processing according to an embodiment of the present disclosure.

FIG. 5 is a pictorial representation of odd pixel processing according to an embodiment of the present disclosure.

Referring to FIG. 5, a first, odd pixel 306$_i$ of an image 304 and neighboring even pixels 306$_{i-1}$ and 306$_{i+1}$ of the image 304 are considered. It is to be understood that the subscript i denotes the pixel of concern while the subscripts i−1 and i+1 respectively denote an immediately preceding and subsequent pixel. Hence, the same designation (306$_i$) is used in FIGS. 4 and 5 in reference to different actual pixels. Each of pixels 306$_{i-1}$, 306$_i$ and 306$_{i+1}$ have R, G, B, W and saturation values associated therewith as indicated by the subscripts i−1, i and i+1. In operation 510, those values are obtained.

In operation 520, the saturation values of the odd pixel 306$_i$ and the even pixel 306$_{i+1}$ are compared and the maximum value is selected and stored. In operation 525, the blue saturation value of the odd pixel 306$_i$ and the preceding even pixel 306$_{i-1}$ are compared and the maximum value of blue saturation is selected and stored. The reason for using the preceding pixel 306$_{i-1}$ relates to the above described concept of the RGBW display as being a checkerboard of white pixels and RGB pixels. Again, if there were no hardware and/or power limitations, the subpixels would be grouped so as to generate an RGB output and a W output. However, to more effectively use resources, the pixels are grouped in RG pairs and BW pairs. As such, when processing an odd pixel, the blue saturation value must be determined based on the current pixel (i.e., $306_i$) and the preceding pixel (i.e., $306_{i-1}$) to render an appropriate value.

In operation 530, values for the white subpixel $320W_i$ and blue subpixel $320B_i$ are determined. For the value of white subpixel $320W_i$, the stored value of maximum saturation is used in conjunction with the values from the odd pixel $306_i$ being processed and the subsequent even pixel $306_{i+1}$. For the value of the blue subpixel $320B_i$, the stored value of maximum blue saturation is used in conjunction with the values from the odd pixel $306_i$ being processed and the preceding even pixel $306_{i-1}$. Again, the stored saturation values are used to effect an alpha blend between a unity filter and a 1D box filter. In operation 530, Equation (6) may be used to determine the valued of $320W_i$ and $320B_i$.

$$320B_i = B_{i-1} + \left(\frac{B_i - B_{i-1}}{2}\right) * sat_b \qquad \text{Equation (6)}$$

$$320W_i = W_i + \left(\frac{W_{i+1} - W_i}{2}\right) * sat$$

In operation 540, the rendered subpixel values (i.e., $320W_i$ and $320B_i$) obtained from processing the odd pixel $306_i$ are output.

In the above description of FIGS. 4 and 5, the values of saturation and blue saturation for each pixel 306 were presumed to reflect the actual saturation. However, the values of saturation and/or blue saturation may be manipulated or modified to effect a different SPR outcome. For example, if the actual saturation values were used and a maximum saturation between two pixels was determined to be 50% (e.g., in operation 420, 520 or 525), it would result in equal proportions of the unity and box filter results. However, multiplying the saturation index by 2 and clipping to 100% would result in mapping the same 50% saturated indices to 100% and thus utilize only the box filter result. Of course, this specific manipulation of the saturation values and blue saturation values is only an example and the saturation values and blue saturation values may be altered in many different ways depending on the input image or desired results. In experimentation, it has been discovered that such modifications to the saturation index improves image quality in some test patterns.

As an alternate of the first embodiment, a minimum inverse saturation (i.e., desaturation) may be used instead of a maximum saturation. By using inverse saturation, the rendering result may be considered as a box filter response added to a difference filter (sharpening) response. In such an alternate form, the values of $320R_i$, $320G_i$, $320B_i$ and $320W_i$ may be obtained using Equation (7).

$$320R_i = \left(\frac{R_i + R_{i+1}}{2}\right) + \left(\frac{R_{i+1} - R_i}{2}\right) * inverse\ sat \qquad \text{Equation (7)}$$

$$320G_i = \left(\frac{G_i + G_{i+1}}{2}\right) + \left(\frac{G_{i+1} - G_i}{2}\right) * inverse\ sat$$

$$320B_i = \left(\frac{B_{i-1} + B_i}{2}\right) + \left(\frac{B_i - B_{i-1}}{2}\right) * inverse\ sat_b$$

$$320W_i = \left(\frac{W_i + W_{i+1}}{2}\right) + \left(\frac{W_{i+1} - W_i}{2}\right) * inverse\ sat$$

In Equation (6), inverse sat is determined as 100%−sat if considered as a percentage and 1−sat otherwise. Similarly, inverse $sat_b$ is determined as 100%−$sat_b$ if considered as a percentage and 1−$sat_b$ otherwise. Here, the use of inverse sat may achieve further benefits in that the processing burden may be further reduced.

Second Embodiment

In the second embodiment of the present disclosure, the same color sharpening filters of Equation (6) are replaced with a luminance sharpening filter to achieve the benefits of a metamer sharpening. This is described in Equation (8).

$$320R_i = \left(\frac{R_i + R_{i+1}}{2}\right) + \left(\frac{L_{i+1} - L_i}{2}\right) * inverse\ sat \qquad \text{Equation (8)}$$

$$320G_i = \left(\frac{G_i + G_{i+1}}{2}\right) + \left(\frac{L_{i+1} - L_i}{2}\right) * inverse\ sat$$

$$320B_i = \left(\frac{B_{i-1} + B_i}{2}\right) + \left(\frac{L_i - L_{i-1}}{2}\right) * inverse\ sat_b$$

$$320W_i = \left(\frac{W_i + W_{i+1}}{2}\right) + \left(\frac{L_{i+1} - L_i}{2}\right) * inverse\ sat$$

where $L_i = aR_i + bG_i + cB_i + dW_i$

In Equation (8), the values of a, b, c and d are approximated luminance proportionality constants that relate the red, green, blue, and white supixels $320R_i$, $320G_i$, $320B_i$ and $320W_i$. In an exemplary implementation, the values of a, b, c and d are set at 2/16, 5/16, 1/16 and 8/16 for ease of hardware implementation. Of course, these values are not limiting and may be altered depending on variances of the input data as well as desired output results.

In Equation (8), the luminance filters are considered 'forward' leaning filters as they consider the $i^{th}$ and $i+1^{th}$ pixels. However, for pair-wise processing, the luminance filter for the $320W_i$ subpixel may be made to lean backwards in that it may consider the $i^{th}$ and $i-1^{th}$ pixels. In that case, the value of $320W_i$ may be determined using Equation (9).

$$320W_i = \left(\frac{W_i + W_{i-1}}{2}\right) + \left(\frac{L_{i-1} - L_i}{2}\right) * inverse\ sat \qquad \text{Equation (9)}$$

The use of the backwards leaning luminance filter of Equation (9) allows for an equal exchange of luminance from the RGB component of the pixel 306, to the W component and vice versa. The ($L_{i+1}$−$L_i$) term in the RGB even pixel processing is equal to the negative of the ($L_{i-1}$−$L_i$) term during the subsequent W odd pixel processing and thus luminance energy is conserved within each pixel pair. In this mode of operation, the result would represent a sharper distribution of luminance energy versus the solely box filtered result, yet would still maintain color not on a pixel-by-pixel basis but on pixel-pair basis. The sharper pixel pair would be considered a metameric match to the blurrier solely box filtered pixel pair.

Figure 6:
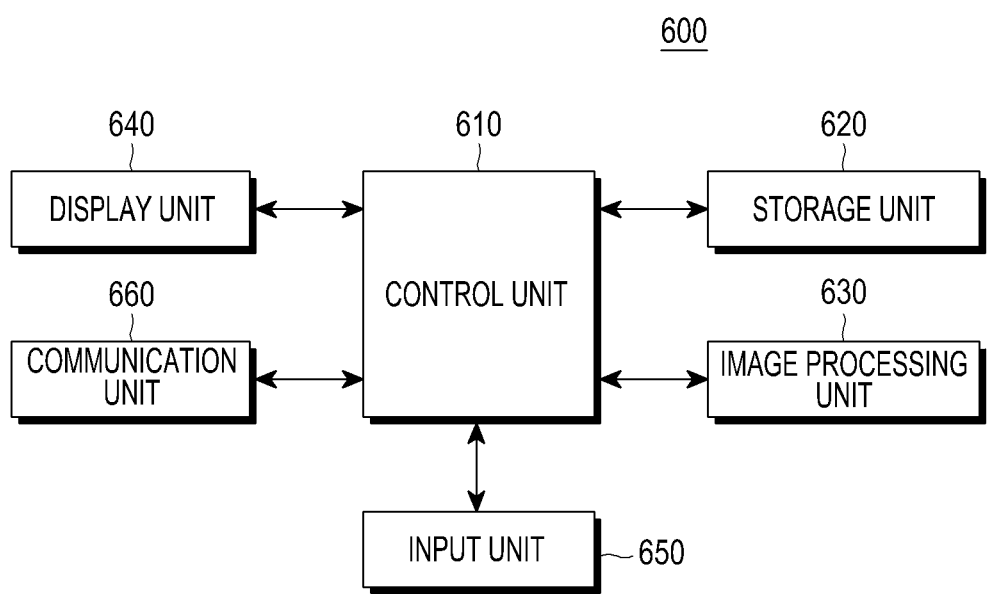
FIG. 6 is a block diagram illustrating an electronic device according to an embodiment of the present disclosure.

FIG. 6 is a block diagram illustrating an electronic device according to an embodiment of the present disclosure.

Referring to FIG. 6, an electronic device 600 may include a control unit 610, a storage unit 620, an image processing unit 630, a display unit 640, an input unit 650, and a communication unit 660.

According to various embodiments of the present disclosure, the electronic device 600 comprises at least one control unit 610. The at least one control unit 610 may be configured to operatively control the electronic device 600. For example, the at least one control unit 610 may control operation of the various components or units included in the electronic device 600. The at least one control unit 610 may transmit a signal to the various components included in the electronic device 600 and control a signal flow between internal blocks of the electronic device 600. The at least one control unit 610 may be or otherwise include at least one processor. For example, the at least one control unit 610 may include an Application Processor (AP), and/or the like.

The storage unit 620 may be configured to store user data, and the like, as well a program which performs operating functions according to various embodiments of the present disclosure. The storage unit 620 may include a non-transitory computer-readable storage medium. As an example, the storage unit 620 may store a program for controlling general operation of an electronic device 600, an Operating System (OS) which boots the electronic device 600, and application program for performing other optional functions such as a camera function, a sound replay function, an image or video replay function, a signal strength measurement function, a route generation function, image processing, and the like. Further, the storage unit 620 may store user data generated according to a user of the terminal 620, such as, for example, a text message, a game file, a music file, a movie file, and the like. According to various embodiments of the present disclosure, the storage unit 620 may store an application or a plurality of applications that individually or in combination operate a camera unit (not shown) to capture (e.g., contemporaneously) one or more images of substantially the same viewpoint, and/or the like. According to various embodiments of the present disclosure, the storage unit 620 may store an application or a plurality of applications that individually or in combination operate the image processing unit 630 or the control unit 610 to perform any of the functions, operations or steps as described above. For example, the application or plurality of applications may cause the image processing unit 630 or the control unit 610 to determine any of pixel saturation values, inverse saturation values, subpixels color values, luminance values, and the like. The storage unit 620 may store an application or a plurality of applications that individually or in combination operate the control unit 610 and the communication unit 660 to communicate with a counterpart electronic device to receive one or more images from the counterpart electronic device, and/or the like. The storage unit 620 may store an application or a plurality of applications that individually or in combination operate display unit 640 to display a graphical user interface, an image, a video, and/or the like.

The image processing unit 630 may be configured to process image data, images, and/or the like and may include an SPR unit (not shown), and the like. In the alternative or in addition, the image processing unit 630 may be configured to perform SPR, and the like.

The display unit 640 displays information inputted by a user or information to be provided to the user as well as various menus of the electronic device 600. For example, the display unit 640 may provide various screens according to the user such as an idle screen, a message writing screen, a calling screen, a route planning screen, and the like. According to various embodiments of the present disclosure, the display unit 640 may display an interface which the user may manipulate or otherwise enter inputs via a touch screen to enter selection of the function relating to the signal strength of the electronic device 600. The display unit 640 can be formed as a Liquid Crystal Display (LCD), an Organic Light Emitting Diode (OLED), an Active Matrix Organic Light Emitting Diode (AMOLED), and the like. However, various embodiments of the present disclosure are not limited to these examples. Further, the display unit 640 can perform the function of the input unit 650 if the display unit 640 is formed as a touch screen.

The input unit 650 may include input keys and function keys for receiving user input. For example, the input unit 650 may include input keys and function keys for receiving an input of numbers or various sets of letter information, setting various functions, and controlling functions of the electronic device 600. For example, the input unit 650 may include a calling key for requesting a voice call, a video call request key for requesting a video call, a termination key for requesting termination of a voice call or a video call, a volume key for adjusting output volume of an audio signal, a direction key, and the like. In particular, according to various embodiments of the present disclosure, the input unit 650 may transmit to the at least one control unit 610 signals related to the operation of a camera unit (not shown), to selection of an image, to selection of a viewpoint, and/or the like. Such an input unit 650 may be formed by one or a combination of input means such as a touch pad, a touchscreen, a button-type key pad, a joystick, a wheel key, and the like.

The communication unit 660 may be configured for communicating with other electronic devices and/or networks. According to various embodiments of the present disclosure, the communication unit 660 may be configured to communicate using various communication protocols and various communication transceivers. For example, the communication unit 660 may be configured to communicate via Bluetooth technology, NFC technology, WiFi technology, 2G technology, 3G technology, LTE technology, or another wireless technology, and/or the like.

It will be appreciated that various embodiments of the present disclosure according to the claims and description in the specification can be realized in the form of hardware, software or a combination of hardware and software.

Any such software may be stored in a non-transitory computer readable storage medium. The non-transitory computer readable storage medium stores one or more programs (software modules), the one or more programs comprising instructions, which when executed by one or more processors in an electronic device, cause the electronic device to perform a method of the present disclosure.

Any such software may be stored in the form of volatile or non-volatile storage such as, for example, a storage device like a Read Only Memory (ROM), whether erasable or rewritable or not, or in the form of memory such as, for example, Random Access Memory (RAM), memory chips, device or integrated circuits or on an optically or magnetically readable medium such as, for example, a Compact Disk (CD), Digital Versatile Disc (DVD), magnetic disk or magnetic tape or the like. It will be appreciated that the storage devices and storage media are various embodiments of non-transitory machine-readable storage that are suitable for storing a program or programs comprising instructions that, when executed, implement various embodiments of the present disclosure. Accordingly, various embodiments provide a program comprising code for implementing apparatus or a method as claimed in any one of the claims of this specification and a non-transitory machine-readable storage storing such a program.

While the disclosure has been shown and described with reference to various embodiments thereof, it will be understood by those skilled in the art that various changes in form and details may be made therein without departing from the spirit and scope of the disclosure as defined by the appended claims and their equivalents. Various embodiments of the present disclosure are described as examples only and are noted intended to limit the scope of the present disclosure. Accordingly, the scope of the present disclosure should be understood as to include any and all modifications that may be made without departing from the technical spirit of the present disclosure.

What is claimed is:

1. A method for rendering a subpixel, the method comprising:
    receiving image data for a first pixel of a captured image;
    receiving image data for a second pixel of the capture image;
    determining a first saturation value of the first pixel and a second saturation value of the second pixel;
    determining a maximum saturation value based on the first saturation value and the second saturation value; and
    rendering a subpixel value using a one dimensional filter or a unity filter based on the determined maximum saturation value.

2. The method of claim 1, wherein the rendering of the subpixel values comprises using the one dimensional filter if the maximum saturation value is above a threshold and using the unity filter if the maximum saturation value is below the threshold.

3. The method of claim 1, wherein the rendering of the subpixel comprises using a blended output of the one dimensional filter and the unity filter.

4. The method of claim 3, wherein the blended output of the one dimensional filter and the unity filter varies based on the maximum saturation value.

5. The method of claim 3, wherein the rendering of the subpixel comprises using the following equation:

$$A = A_i + \left(\frac{A_{i+1} - A_i}{2}\right) * sat$$

where A is the rendered value of the subpixel, $A_i$ is a color value of the first pixel, $A_{i+1}$ is a color value of the second pixel, and sat is the determined maximum saturation.

6. The method of claim 3, wherein the rendering of the subpixel comprises using the following equation:

$$A = A_{i-1} + \left(\frac{A_i - A_{i-1}}{2}\right) * sat$$

where A is the rendered value of the subpixel, $A_i$ is a color value of the first pixel, $A_{i-1}$ is a color value of the second pixel, and sat is the determined maximum saturation.

7. The method of claim 6, wherein the determined maximum saturation is based on a blue component of the image data for the first pixel and a blue component of the image data for the second pixel.

8. The method of claim 1, wherein the determining of the first saturation value and the second saturation value comprises using the following equation:

$$sat = 100\% - \frac{\min(r, g, b)}{\max(r, g, b)}$$

wherein r is a red value of the respective pixel, g is a green value of the respective pixel, and b is a blue value of the respective pixel.

9. The method of claim 8, wherein the determining of the maximum saturation value comprises multiplying the saturation value by 2 and clipping the result to 100%.

10. The method of claim 1, wherein the rendering of the subpixel comprises using the following equation:

$$A = \left(\frac{A_i + A_{i+1}}{2}\right) + \left(\frac{A_{i+1} - A_i}{2}\right) * \text{inverse } sat$$

where A is the rendered value of the subpixel, $A_i$ is a color value of the first pixel, $A_{i+1}$ is a color value of the second pixel, and inverse sat is determined as 100% minus the determined maximum saturation.

11. The method of claim 1, wherein the rendering of the subpixel comprises using the following equation:

$$A = \left(\frac{A_{i-1} + A_i}{2}\right) + \left(\frac{A_i - A_{i-1}}{2}\right) * \text{inverse } sat$$

where A is the rendered value of the subpixel, $A_i$ is a color value of the first pixel, $A_{i-1}$ is a color value of the second pixel, and inverse sat is determined as 100% minus the determined maximum saturation.

12. The method of claim 11, wherein the determined maximum saturation is based on a blue component of the image data for the first pixel and a blue component of the image data for the second pixel.

13. The method of claim 1, wherein the rendering of the subpixel comprises using the following equation:

$$A = \left(\frac{A_i + A_{i+1}}{2}\right) + \left(\frac{L_{i+1} - L_i}{2}\right) * \text{inverse } sat$$

where A is the rendered value of the subpixel, $A_i$ is a color value of the first pixel, $A_{i+1}$ is a color value of the second pixel, $L_i$ is a luminance value of the first pixel, $L_{i+1}$ is a luminance value of the second pixel, and inverse sat is determined as 100% minus the determined maximum saturation.

14. The method of claim 13, wherein the value of $L_i$ is determined using the following equation:

$$L_i = aR_i + bG_i + cB_i + dW_i$$

where $R_i$ is a red component of the image data for the first pixel, $G_i$ is a green component of the image data for the first pixel, $B_i$ is a blue component of the image data for the first pixel, $W_i$ is a white component of the image data for the first pixel, and a, b, c and d are approximated luminance proportionality constants.

15. An apparatus for rendering a subpixel, the apparatus comprising:
    a display unit configured to display an image; and
    an image processing unit configured to receive image data for a first pixel of a captured image, to receive image data for a second pixel of the capture image, to determine a first saturation value of the first pixel and a second saturation value of the second pixel, to determine a maximum saturation value based on the first saturation value and the second saturation value, and to render a subpixel value using a one dimensional filter or a unity filter based on the determined maximum saturation value.

16. The apparatus of claim 15, wherein the image processing unit is further configured to render the subpixel values by using the one dimensional filter if the maximum saturation value is above a threshold and using the unity filter if the maximum saturation value is below the threshold.

17. The apparatus of claim 15, wherein the image processing unit is further configured to render the subpixel values by using a blended output of the one dimensional filter and the unity filter.

18. The apparatus of claim 17, wherein the blended output of the one dimensional filter and the unity filter varies based on the maximum saturation value.

19. The apparatus of claim 17, wherein the image processing unit is further configured to render the subpixel values by using the following equation:

$$A = A_i + \left(\frac{A_{i+1} - A_i}{2}\right) * sat$$

where A is the rendered value of the subpixel, $A_i$ is a color value of the first pixel, $A_{i+1}$ is a color value of the second pixel, and sat is the determined maximum saturation.

20. The apparatus of claim 17, wherein the image processing unit is further configured to render the subpixel values by using the following equation:

$$A = A_{i-1} + \left(\frac{A_i - A_{i-1}}{2}\right) * sat$$

where A is the rendered value of the subpixel, $A_i$ is a color value of the first pixel, $A_{i-1}$ is a color value of the second pixel, and sat is the determined maximum saturation.

21. The apparatus of claim 20, wherein the determined maximum saturation is based on a blue component of the image data for the first pixel and a blue component of the image data for the second pixel.

22. The apparatus of claim 15, wherein the image processing unit is further configured to determine the first saturation value and the second saturation value by using the following equation:

$$sat = 100\% - \frac{\min(r, g, b)}{\max(r, g, b)}$$

wherein r is a red value of the respective pixel, g is a green value of the respective pixel, and b is a blue value of the respective pixel.

23. The apparatus of claim 22, wherein the image processing unit is further configured to determine the maximum saturation value by multiplying the saturation value by 2 and clipping the result to 100%.

24. The apparatus of claim 15, wherein the image processing unit is further configured to render the subpixel values by using the following equation:

$$A = \left(\frac{A_i + A_{i+1}}{2}\right) + \left(\frac{A_{i+1} - A_i}{2}\right) * \text{inverse } sat$$

where A is the rendered value of the subpixel, $A_i$ is a color value of the first pixel, $A_{i+1}$ is a color value of the second pixel, and inverse sat is determined as 100% minus the determined maximum saturation.

25. The apparatus of claim 15, wherein the image processing unit is further configured to render the subpixel values by using the following equation:

$$A = \left(\frac{A_{i-1} + A_i}{2}\right) + \left(\frac{A_i - A_{i-1}}{2}\right) * \text{inverse } sat$$

where A is the rendered value of the subpixel, $A_i$ is a color value of the first pixel, $A_{i-1}$ is a color value of the second pixel, and inverse sat is determined as 100% minus the determined maximum saturation.

26. The apparatus of claim 25, wherein the determined maximum saturation is based on a blue component of the image data for the first pixel and a blue component of the image data for the second pixel.

27. The apparatus of claim 15, wherein the image processing unit is further configured to render the subpixel values by using the following equation:

$$A = \left(\frac{A_i + A_{i+1}}{2}\right) + \left(\frac{L_{i+1} - L_i}{2}\right) * \text{inverse } sat$$

where A is the rendered value of the subpixel, $A_i$ is a color value of the first pixel, $A_{i+1}$ is a color value of the second pixel, $L_i$ is a luminance value of the first pixel, $L_{i+1}$ is a luminance value of the second pixel, and inverse sat is determined as 100% minus the determined maximum saturation.

28. The apparatus of claim 27, wherein the value of $L_i$ is determined using the following equation:

$$L_i = aR_i + bG_i + cB_i + dW_i$$

where $R_i$ is a red component of the image data for the first pixel, $G_i$ is a green component of the image data for the first pixel, $B_i$ is a blue component of the image data for the first pixel, $W_i$ is a white component of the image data for the first pixel, and a, b, c and d are approximated luminance proportionality constants.

* * * * *